(12) United States Patent
Silva et al.

(10) Patent No.: US 8,172,638 B2
(45) Date of Patent: May 8, 2012

(54) METHOD AND APPARATUS FOR EDUCATION AND ENTERTAINMENT

(75) Inventors: Luis Silva, North Hollywood, CA (US); Brian Cord Gibson, North Hollywood, CA (US)

(73) Assignee: Parental Media LLC, Ferndale, MI (US)

( * ) Notice: Subject to any disclaimer, the term of this patent is extended or adjusted under 35 U.S.C. 154(b) by 1208 days.

(21) Appl. No.: 11/460,324

(22) Filed: Jul. 27, 2006

(65) Prior Publication Data

US 2007/0046774 A1    Mar. 1, 2007

Related U.S. Application Data

(60) Provisional application No. 60/706,108, filed on Aug. 6, 2005.

(51) Int. Cl.
*A63H 33/00* (2006.01)

(52) U.S. Cl. ...................... 446/227; 348/14.01

(58) Field of Classification Search ............ 446/227, 446/268, 321; 40/738
See application file for complete search history.

(56) References Cited

U.S. PATENT DOCUMENTS

| | | | |
|---|---|---|---|
| 4,659,319 A | 4/1987 | Blair | |
| 4,993,987 A | 2/1991 | Hull et al. | |
| 5,403,224 A * | 4/1995 | Gintling | 446/321 |
| 5,433,610 A | 7/1995 | Godfrey et al. | |
| 5,595,389 A | 1/1997 | Parulski et al. | |
| 5,947,791 A * | 9/1999 | Taylor | 446/321 |
| 6,183,338 B1 * | 2/2001 | Mallette | 446/337 |
| 6,439,723 B1 * | 8/2002 | Tano | 353/15 |
| 6,447,359 B1 | 9/2002 | Crump | |
| 6,463,205 B1 | 10/2002 | Aschbrenner et al. | |
| 6,511,359 B1 * | 1/2003 | Lui | 446/321 |
| 6,692,330 B1 * | 2/2004 | Kulick | 446/297 |
| 6,729,930 B1 * | 5/2004 | Lui | 446/139 |
| 6,769,771 B2 | 8/2004 | Trumbull | |
| 6,940,432 B1 * | 9/2005 | Hall | 341/110 |
| 2002/0007718 A1 * | 1/2002 | Corset | 84/609 |
| 2004/0077274 A1 * | 4/2004 | Becker et al. | 446/268 |
| 2004/0159031 A1 * | 8/2004 | Chang | 40/800 |

OTHER PUBLICATIONS http://www.danceheads.com.
http://youtube.com/watch?v=Pu0PwwYohD0&mode=related&search=.
http://www.logitech.com/index.cfm/products/details/US/EN,CRID=2204,CONTENTID=10562.

* cited by examiner

*Primary Examiner* — Curtis Kuntz
*Assistant Examiner* — Maria El-Zoobi
(74) *Attorney, Agent, or Firm* — R. Dabney Eastham

(57) ABSTRACT

The invention provides a method and apparatus for educating and entertaining people, such as children, in which the image and voice of a known person are incorporated into a stock medium such as a video or a doll. In the case of children such as toddlers, the known person may be a caregiver, such as a parent, and the recorded voice and the image of at least the face of the caregiver are incorporated into the medium.

1 Claim, 4 Drawing Sheets

METHOD AND APPARATUS FOR EDUCATION AND ENTERTAINMENT

CROSS-REFERENCE TO RELATED APPLICATION

This non-provisional patent application claims benefit and priority under 35 U.S.C. §119(e) of the filing of U.S. Provisional Patent Application Ser. No. 60/706,108 filed on Aug. 6, 2005, titled METHOD AND APPARATUS FOR EDUCATION AND ENTERTAINMENT, the contents of which are expressly incorporated herein by reference for all purposes.

BACKGROUND OF THE INVENTION

1. Field of the Invention

The field of the invention is that of educational methods and systems.

2. Description of Related Art

People generally prefer to learn from and be motivated by persons that they know and trust ("known persons"). The known persons can be relatives, friends, teachers, employers, celebrities, and the like.

The above comments are illustrated by the exemplary situation of children and their caregivers. Methods, systems, toys and other devices for educating children have been developed over the years and range from dolls and colored blocks to sophisticated computer-implemented interactive learning tools. The term "children" as used herein refers to infants or new-borns (up to twelve months old), toddlers (twelve to twenty-four months old), and older children (older than twenty-four months).

Children learn best directly from their caregivers, due to the bond they have with the caregivers. The term "caregiver" as used herein refers to the parents, grandparents, older siblings or the other persons who have responsibility to raise and care for the child. Nevertheless, a problem exists in that a child's caregiver or caregivers may not be able to be with the child during all or part of the child's waking life, due to career or other commitments. Other persons, such as nannies or day care center personnel, may have to look after the child during that part of the child's life. However, the child may not have a bond with such persons as it may have with its caregivers.

However, known persons may not be available in person or by long-range transmission means, such as video-conferencing, when needed to impart educational and/or other information. Moreover, recording an instructional session by a known person for later reproduction to the intended audience may require resources and expertise that may be unavailable or too costly to acquire. Thus, a need exists in the art for a method and system for providing educational and/or other information to people using the personality of a known person that does not require considerable resources and/or expertise on the part of the known person. It would also be advantageous to have a method and system for producing customized educational and entertainment media by uniting the image and voice of a known person with a stock medium.

BRIEF SUMMARY OF THE INVENTION

Method and system embodiments of the present invention address these needs by uniting the recorded image of at least the face of a known person, such as the caregiver for a child, and the recorded voice of the known person, in stock media such as systems and apparatuses for educating and entertaining.

An embodiment of a method of communicating with people is disclosed. The method may include recording the voice of a known person and recording the image of at least the face of the known person. The method may further include incorporating the image of the face of the known person in a stock medium and incorporating the recorded voice of the known person in the stock medium, whereby the stock medium is transformed into a customized medium.

The medium may be an educational program that is recorded on a DVD or other storage device or an educational toy such as a doll, according to embodiments of the present invention.

BRIEF DESCRIPTION OF THE DRAWINGS

Other features, and advantages of the present invention will become more fully apparent from the following detailed description of exemplary embodiments, the appended claims, and the accompanying drawings in which:

DETAILED DESCRIPTION

Figure 1:
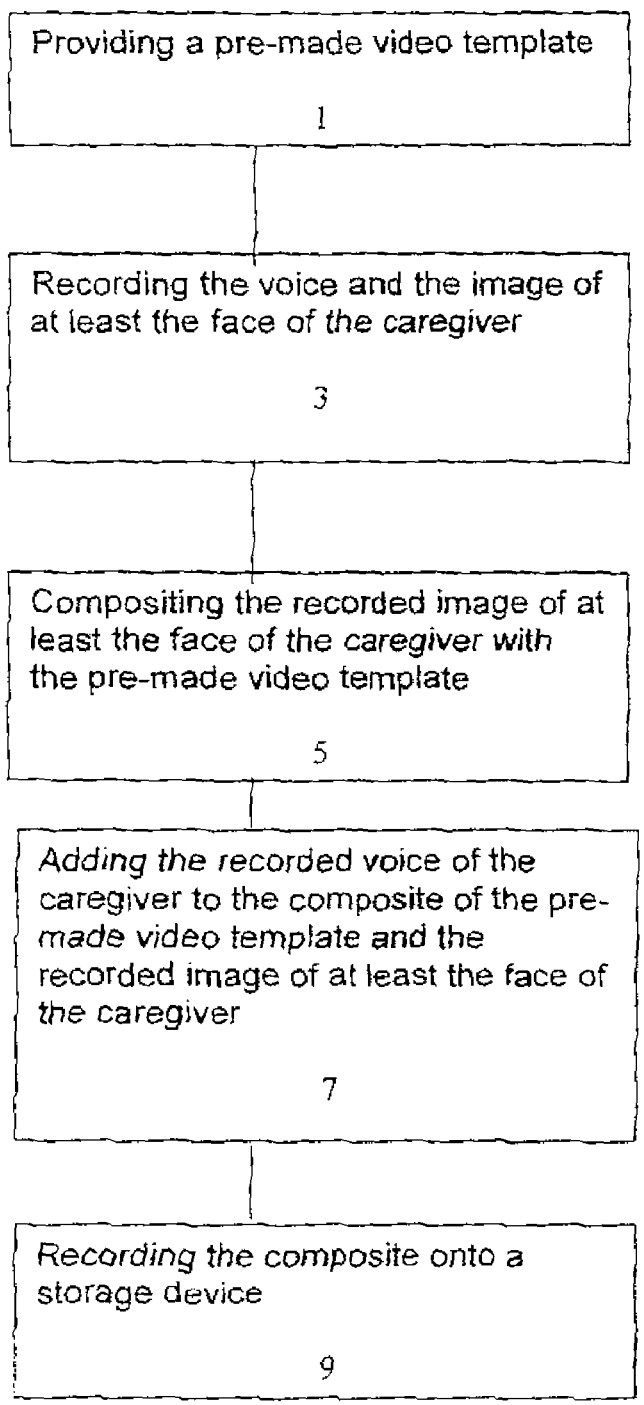
FIG. 1 is a flow chart showing the generalized steps of a preferred embodiment of a method according to the invention.

An embodiment of a method for practicing the present invention is described below. The method may include recording the voice of a known person. The method may further include recording the image of at least the face of the known person. The method may further include incorporating the image of at least the face of the known person in a stock medium. The method may further include incorporating the recorded voice of the known person in the stock medium, whereby the stock medium is transformed into a customized medium.

The medium may be an educational program recorded on a DVD or other storage device that can be played on a computer or television set, as in the first preferred embodiment, or an educational toy such as a doll, as in the second preferred embodiment. The term "stock medium" as used in this specification refers to a medium that can be customized by the addition of a known person's recorded image and voice. A "stock medium" can be created in advance of its customization and held in stock or inventory for such use.

A feature of the present invention is providing a method for producing customized educational and entertainment media by uniting the image and voice of a known person with a stock medium. Another feature of the present invention is to provide a learning platform where children can be taught and entertained by their real life caregivers, such as parents, even when the caregivers are not actually present. Still another feature of the present invention is providing a method for including both the real life voice and an image of a caregiver into a children's learning and entertainment video. Yet another feature of the present invention is providing an interactive children's learning and entertainment doll that has the visual likeness and the actual voice of a caregiver. Another feature of the present invention is providing a means of combining the real life voice and the real life image of a caregiver in a doll that the child can hold, carry, and embrace.

An embodiment of a method for creating a program for storage on a DVD or other storage medium is disclosed, according to the present invention. The DVD or other storage medium is capable of being played on a computer such as a personal computer that has a display (such as a cathode ray tube, flat screen panel or projector) and speakers for sound reproduction, or on a DVD player attached to a television set or projector. The program may be an instructional and/or entertaining program having a character with the voice and the face of the known person. According to another embodiment of the present method, the face and body of the known person may be incorporated into the program.

The program may have a static format such as a video according to an embodiment of the present invention. In another embodiment the program may have an interactive format such as a video game. For example and not by way of limitation, the video game may be configured for playing on a Sony™ Playstation™, Nintendo™ GameCube™ or GameBoy™, Microsoft™ Xbox™, or any other suitable gaming system. According to one method embodiment, the face and voice of the known person may be incorporated into the video game. According to another embodiment the video game may be recorded on a DVD, game cartridge or other suitable storage device.

For example, and not by way of limitation, the known person could be a teacher of art history in a high school. According to this example, the program could combine the image and voice of the teacher with a stock program in which a main character (supplied later with the image and voice of the teacher) takes the teacher's class for a tour through an art museum. The stock program could provide a tour of a museum or museums on another continent. Because the travel costs would be prohibitive, most teachers of art history would not be able to actually take their classes to such museums, except under extraordinary circumstances. In fact, obtaining video tape of one art teacher while visiting such museums would be expensive. Accordingly, this embodiment of the invention would permit art teachers anywhere to create customized video programs with the appearance of giving tours of the Uffizi and Louvre without ever having to actually visit Florence or Paris. Thus, one such stock program could be created for the use of many teachers. The expense of creating the stock program is thereby spread over many teachers. Alternatively, the cost of creating the stock program may be recovered by incremental sales of customized programs. A high-quality (and thus expensive) stock program for use with this embodiment of the invention would be affordable. Because of the high costs and the expertise needed to create a high quality stock program, a teacher or even a school could not typically afford the creation of such a program.

The detailed description of the exemplary embodiment that follows is for creating programs recorded on DVD that are suitable for infants, toddlers, and older children. It will be understood that the method so described is also suitable with appropriate choice of stock programs for older audiences, e.g., the high school art history class mentioned above, or any other lecture or seminar. One of skill in the art will also readily recognize that references to "caregiver" in the description of the preferred embodiment is not meant to exclude other known persons from the scope of this invention.

A stock program in the form of a pre-made video template may be created by a service provider and may be quite professional, with a plot or script, dances, live-action vignettes, stimulating imagery of animals, objects, and places captured two dimensionally, three dimensionally, and in live action, special visual effects and a sound track with songs, music and other sound effects. A single stock program or pre-made video template may be customized or modified for different users by the insertion of at least the face (and perhaps the entire body) and voice of the appropriate known person, e.g., a caregiver for a child, or any other known person, so that the expense of creating the single stock program may be spread over many users or customers.

The following is an exemplary embodiment of a script for a stock program ("Colors") suitable for a toddler, in which the "Parent" character is the caregiver or known person.

COLORS
(FIREWORKS)
Animated FIREWORKS slowly illuminate a blackened screen.

One by one, COLORS with SWIZZLE STICK-JOVIAL sound effects launch upwards into the darkness and brilliantly explode.

A solitary RED blast.
A solitary GREEN blast.
A solitary YELLOW blast.
FADE TO BLACK.
PARENT stands camera left.
PARENT:
Hi, (Baby's name). Today we are going to learn about colors. Colors are fun. (Baby's name), you're going to like learning about Colors.
A playful RED ROCKET materializes camera right.
PARENT (CONT'D):
That's my friend, Rudy the Rocket.
RUDY:
Hello.
Rudy waives and blasts into the air, midway up he explodes into a brilliant RED firework.
PARENT:
Red.
Rudy materializes camera right, this time he's Green.
Rudy waives and blasts into the air, midway up he explodes into a brilliant GREEN firework.
PARENT (CONT'D):
Green.
Rudy materializes camera right, this time he's Yellow.
RUDY:
Hello.
Rudy waives and blasts into the air, midway up he explodes into a brilliant YELLOW firework.
PARENT:
Yellow.
Rudy materializes camera right, this time he's Blue.
RUDY:
Hello.
Rudy waives and blasts into the air, midway up he explodes into a brilliant BLUE firework.
PARENT:
Blue.
Rudy materializes camera right, this time he's White.
RUDY:
Hello.
Rudy waives and blasts into the air, midway up he explodes into a brilliant WHITE firework.
PARENT:
White.
FADE TO BLACK.
(PALETTE)
The Parent's head is at the center of an ARTIST'S PALETTE surrounded by colors: Red, Green, Yellow, Blue, White, Pink, Brown, Black.

The above stock program is intended to teach the child to associate the colors with their names in an entertaining and visually arresting way, with movement, drama, and auxiliary characters such as "Rudy the Rocket." The stock program may be created as a background in which the caregiver later appears in the role of the "Parent." Those of skill in the art will readily recognize that any sort of script on any subject matter may be used to create a stock program for use with the embodiments of the present invention as disclosed herein. Hence, the scope of the present invention is not limited to the above exemplary script.

A method embodiment of the present invention may be used to add the face and voice of the caregiver so that the program is customized to employ the familiar and trusted likeness and voice of the caregiver of the child. Referring now to FIG. 1, a method embodiment of the present invention is shown in a flow chart as further described below.

The method may include providing 1 a pre-made video template. The term "video" as used herein refers to full motion video and audio in any suitable format, e.g., digital or analog, and in any kind of video media. The pre-made video template forms the stock program that may be combined with the recorded image and voice of the caregiver. As noted above, the pre-made video template can cover any suitable subject matter and have any suitable script.

The method may further include recording 3 the voice and the image of at least the face of the caregiver. The caregiver may record her voice by speaking or singing the lines of a predetermined script or song while her image also is being video recorded. The caregiver may be required by the script to speak directly to the individual child (such as by calling the child by name) in order to encourage the child to participate. Of course any other suitable action may be taken by the caregiver whether scripted or not.

The method may further include compositing 5 the recorded image of at least the face of the caregiver with the pre-made video template. By compositing 5, the image of the caregiver may be combined with the pre-made video template, for example by insertion of the image of the caregiver into portions of the video frames of the video template.

The method may further include adding 7 the recorded voice of the caregiver to the composite of the pre-made video template and the recorded image of at least the face of the caregiver. The recorded voice of the caregiver may be added to the soundtrack of the pre-made video template according to one embodiment of the method.

The method may further include recording 9 the composite onto a storage device. The customized program of the composite of the pre-made video template and the recorded image of the caregiver and the recorded voice of the caregiver may be recorded onto any suitable storage device. According to various embodiments, the customized program may be digital or digitized and the storage device may be a digital versatile disc (DVD), a compact disc (CD), digital video (DV) tape, a hard disk drive, or any other suitable device for storing digital information. According to alternative embodiments of the present invention, the customized program may be analog and stored in a storage device comprising a videocassette tape or any other suitable analog video recording media.

Figure 2:
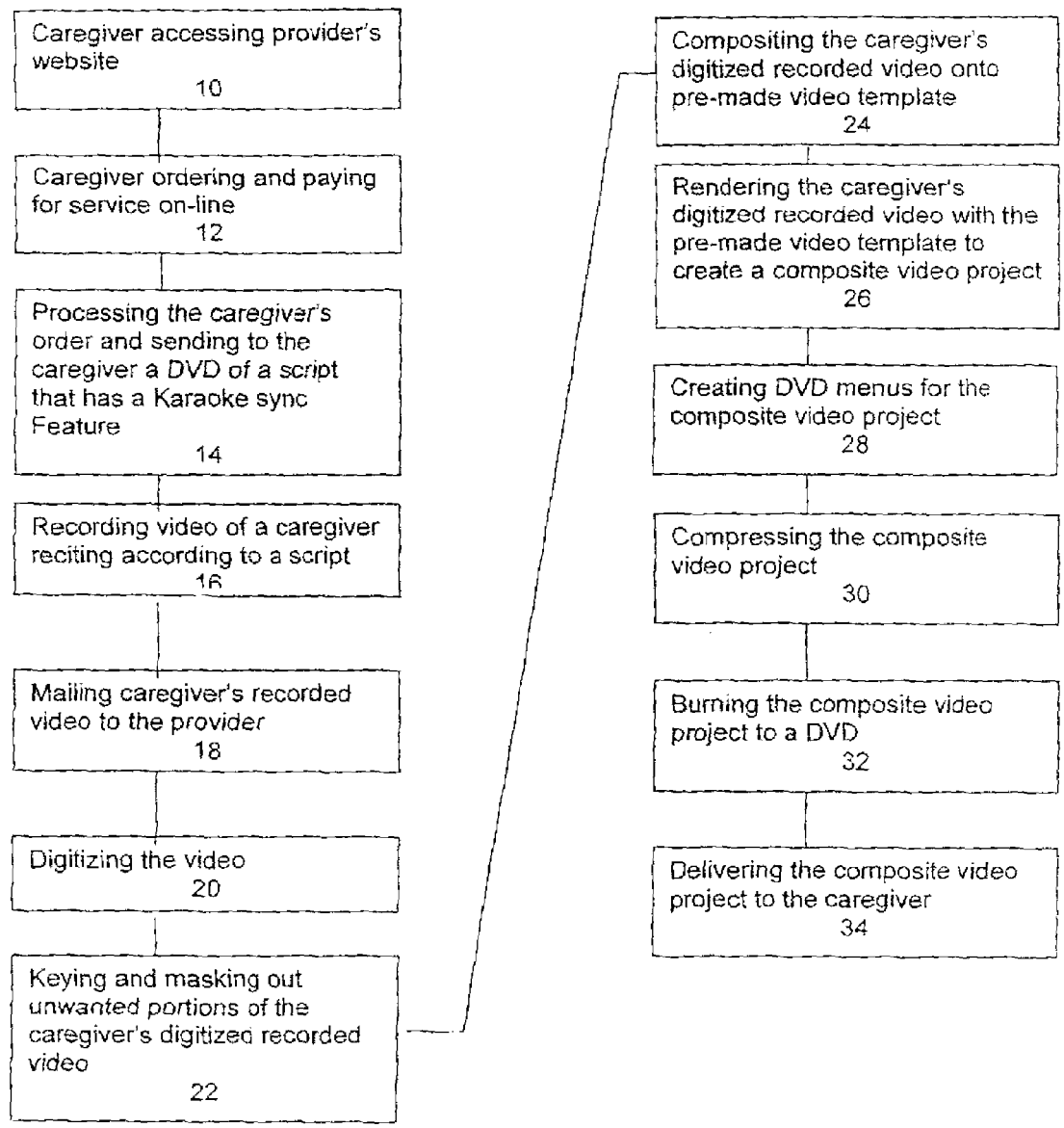
FIG. 2 is a flow chart of a method embodiment according to the present invention.

Referring now to FIG. 2, an embodiment of a method for creating a customized video program for either entertainment or education or both is shown in a flow chart. This method embodiment includes interaction between the caregiver and a service provider, such as a business. The service provider may produce and/or supply customized programs such as instructional and/or entertaining programs. The programs may include a character with at least the face and voice, and possibly the rest of the body of the caregiver. This exemplary method of the present invention may be a business method.

The embodiment of the method may include a caregiver accessing 10 a provider's website. According to one embodiment of the method, the caregiver may access the site of the provider over a computer network such as the Internet.

The embodiment of the method may further include the caregiver ordering 12 and paying for service. Payment for service may be an on-line transaction according to one embodiment. For example, the caregiver may fill out an on-line order form and provide payment by credit card, PayPal™ or any other payment method According to alternative embodiments, the service may be ordered by phone or mail. The caregiver may be issued a unique customer identification number.

The embodiment of the method may further include processing 14 the caregiver's order and sending the caregiver a DVD of a script that has a Karaoke sync feature. In this embodiment, the provider may process the caregiver's order and send a DVD or other playable storage medium to the caregiver. The DVD may have a script with a karaoke synchronization feature. The DVD may also include instructions on using a video camera. The provider may send the DVD by mail or other delivery service. Alternatively, the provider could e-mail a file with this script with karaoke synchronization feature to be played on the caregiver's computer or recorded by the caregiver on a DVD or other playable storage medium to be played on a different apparatus such as a DVD player attached to a television set.

The embodiment of the method may further include recording 16 video of the caregiver reciting according to a script. The caregiver or another person may use a video camera to record both video and audio of the caregiver reciting lines of the script. According to one embodiment, the caregiver or "customer" may follow the script as presented in a karaoke format, so the timing of the delivery matches the pacing of the action in the pre-made video template. The caregiver may use any format of video recorder, for example and not by way of limitation, DV, VHS, Hi8, 8 mm and any other suitable video recording formats. Recording 16 may be achieved by parents (caregivers) visiting a video recording studio (service provider) and standing in front of a "green screen" (for keying) in the studio and reading a teleprompter with a script, while being video recorded for video and audio, according to yet another embodiment of the present invention.

The embodiment of the method may further include sending 18 the caregiver's recorded video to the service provider. Sending 18 the caregiver's recorded video to the service provider may comprise the caregiver mailing the recorded video to the service provider for the provider's use in creating the customized program. Sending 18 may be accomplished by hand delivery of a storage device or electronic delivery as an attachment to an email or uploaded to a provider's website, according to additional embodiments of the present invention.

The embodiment of the method may optionally include digitizing 20 the video. Where the caregiver's video is initially recorded using analog means, the analog video may be converted to digital video to facilitate the customization process. Those of ordinary skill in the art will be readily familiar with various means for digitizing analog video, and thus will not be further expounded upon herein.

The embodiment of the method may optionally include keying and masking out 22 unwanted portions of the caregiver's digitized recorded video. The portions of the caregiver's digitized recorded video that are not needed may be optionally keyed and masked out. These portions generally will include the background scene in which the caregiver is video recorded. The portions of the video images that are to remain will include at least the face of the caregiver and may include the entire body of the caregiver that is visible in the caregiver's digitized video recording. According to one embodiment of the present invention, the face of the caregiver may be all that remains, if the character in the program will have only the face of the caregiver in combination with an animated body.

The embodiment of the method may optionally include compositing 24 the caregiver's digitized recorded video onto pre-made video template. The caregiver's remaining digitized recorded video that has not been masked out may then be added or overlaid into a pre-made video template. The pre-made video template will, of course, be prepared in advance so that it is available to make the composite video. The caregiver will appear to have been in the "studio" in which the pre-made video template was recorded, because the caregiver will appear to interact with characters and animated lesson plans that are part of the pre-made video template once the composite video is completed.

The embodiment of the method may optionally include rendering 26 the caregiver's digitized recorded video with the pre-made video template to create a composite video project. If the caregiver's digitized recorded video is not already a single composite video recording with audio, it may at this point be combined into one file with the pre-made video template to form a composite video project that will combine both the audio and at least the face of the caregiver with the pre-made video template.

The embodiment of the method may optionally include creating DVD menus 28 for the composite video project. Chapter headings, special features, continuous play and other features common to a DVD recording may optionally be created and added to the file of the composite video project according to this feature of the method embodiment of the present invention.

The embodiment of the method may optionally include compressing 30 the composite video project. Where desired or required, the file of the composite video project may be compressed by a DVD coder/decoder (codec) to create a completed project or a compressed composite video recording.

The embodiment of the method may optionally include burning 32 the composite video project to a DVD. Where a finished DVD is the desired end product, the file of the compressed composite video recording recorded onto one or more DVDs. According to alternative embodiments, the file could be stored in any appropriate memory device such as a hard drive, CD, and the like. Alternatively, a video camera and recording equipment may be used to "live edit" a DVD, and thereby directly create a DVD of the composite video without additional processing as described herein.

The embodiment of the method may further include delivering 34 the composite video project to the caregiver. According to this feature of the present invention, the provider may send a DVD to the caregiver by mail or other delivery service. Alternatively, the composite video project could be e-mailed to the caregiver so the caregiver could record her own DVD or simply store the file on her computer's hard drive.

Another embodiment of the present invention is a medium in the form of an educational and/or entertainment toy in the form of a doll. As in other embodiments, the known person may be a caregiver of a child. However, the known person may be any other known person. For example, and not by way of limitation, a highly entertaining toy might be made with the face and voice of a known person such as an employer or co-worker.

This embodiment of the present invention may be practiced by placing an image of the known person's face on the face of a doll and recording personal messages spoken by the known person's voice in an apparatus contained in the doll for later reproduction of the audio recording. If the known person is a caregiver this embodiment of the invention may provide a highly effective tool for engaging the child's mind with the individuals to whom they respond best.

Figure 3:
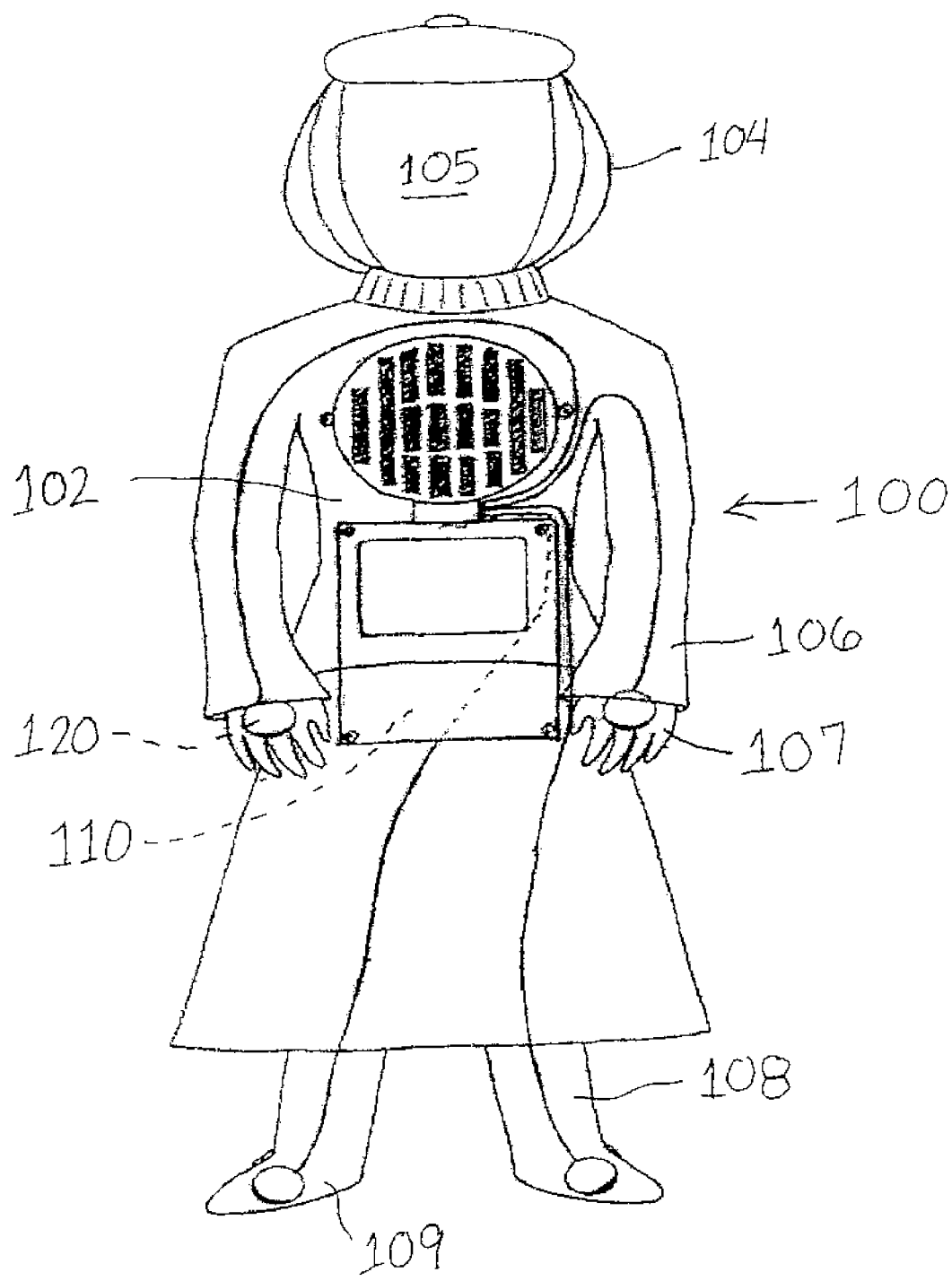
FIG. 3 is a front perspective view of an embodiment of an educational toy according to the present invention.

FIG. 3 is an illustration of an embodiment of a doll 100 according to the present invention that may be appropriate for children. The doll 100 has a generally human form with a torso 102 attached to a head 104, two arms 106 with hands 107, and two legs 108 with feet 109. The head 104 has a blank face portion 105 on which an image of the caregiver's face is to be placed. The doll 100 shown in FIG. 3 is female in appearance and is appropriate for use with female caregivers. Dolls having a male appearance may, of course, be provided for use with male caregivers where desired. However, other sorts of dolls or animal shaped toys may also be used consistent with the present invention.

According to one embodiment, the doll 100 may have a plush outer surface covering a resilient layer so that the child will be willing to hold, carry, and embrace the doll 100 as if it were the child's actual caregiver. According to another aspect the doll may include an apparatus 110 for selectively recording and/or storing and reproducing audio. According to the embodiment illustrated in FIG. 3, the apparatus 110 for recording, storing, and reproducing sounds such as personal messages in the form of statements or exhortations by the caregiver may be found at least partially contained in the torso 102 of doll 100. The personal messages may be chosen by the caregiver and could be tailored to the child and a daily situation, e.g., "don't fight with your brother," "eat your vegetables," and "mommy misses you and will be back home this evening." A script book may be provided to suggest appropriate messages to caregivers, according to another embodiment of the present invention. The messages may be recorded in any number of re-recordable "mailboxes" provided in the apparatus 110, according to yet another embodiment. The caregiver could record favorite songs and sounds as well as the personal messages in the mailboxes.

An exemplary apparatus 110 in the form of a processor with memory capacity and electronics contained in a toy (a child's chair) for a parent to record messages for playback according to specified alarms or times are disclosed in U.S. Pat. No. 6,589,058 to Brooks for "Child's Learning Chair," the disclosure of which patent is hereby incorporated by reference for all purposes.

The apparatus 110 in the doll 100 may be set to play the pre-recorded messages at set times according to an embodiment of the present invention. Alternatively, the messages could be played in response to the actions of the child, such as squeezing the hands 107 or the feet 109 of the doll 100 and thereby actuating "paddles" or switches 120 that are embedded in each of the hands 107 and the feet 109 and attached by wires to the apparatus 110, according to the illustrated embodiment in FIG. 3. Of course, those skilled in the art will readily recognize that switches could also be embedded elsewhere in the doll 100, such as the torso 102. Actuating one of the switches 120 may cause the apparatus 110 to play a pre-recorded message in one of the mailboxes, according to an embodiment of the present invention. The apparatus 110 may be set to play the pre-recorded messages in the mailboxes sequentially in response to the actuation of the switches 120 or each of the switches 120 could be linked to its own mailbox so that only messages recorded in that mailbox will be played when that particular switch 120 is actuated, according to other embodiments.

An exemplary apparatus contained in a doll or figure for reproducing stored speech when switches in the doll's extremities are actuated by a child or other person are known to the art. See, for example, U.S. Pat. No. 6,882,824 to Woods for "Interactive Teaching Toy," the disclosure of which is hereby incorporated by reference for all purposes.

Figure 4:
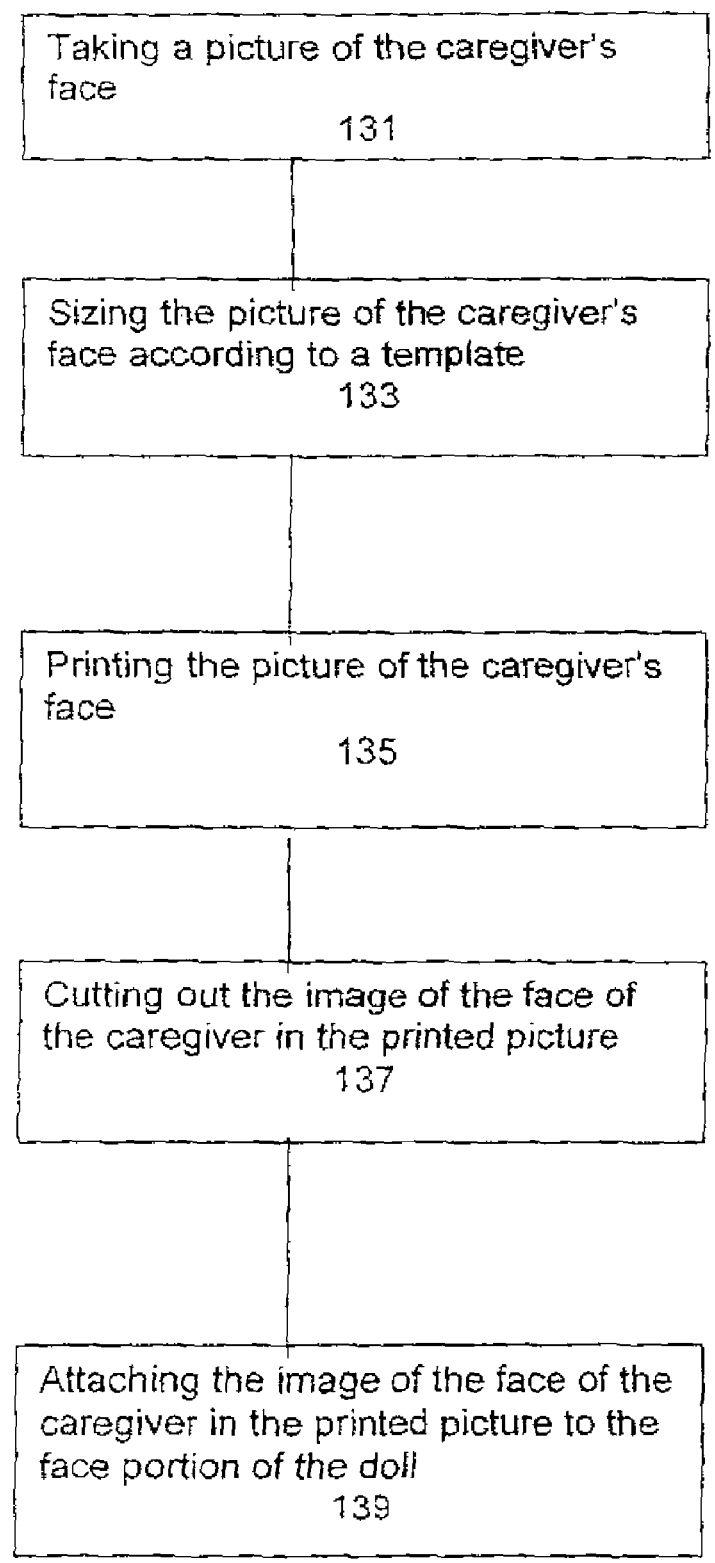
FIG. 4 is a flow chart of an embodiment of a method for incorporating the image of the face of a caregiver in the educational toy shown in FIG. 3, according to the present invention.

FIG. 4 is a flow chart of an embodiment of a method for incorporating the image of the face of the caregiver in a toy, such as doll 100 shown in FIG. 3. It will be understood that, as in the embodiment shown and described in connection with FIG. 3, the method described in connection with FIG. 4 could be used for any known person and not only for caregivers.

The known person or caregiver may practice this method by following instructions and materials provided with the doll 100. Alternatively, the provider of the doll 100, as part of a service to deliver dolls pre-customized with the image of the face of the caregiver, may practice this method on behalf of the caregiver. Additional aspects of this method embodiment of the present invention are described below.

The method may include taking 131 a picture of the caregiver's face. According to one embodiment, the face of the caregiver may be photographed. The photograph may be taken with a digital still camera, because a digital image is more easily manipulated outside a photographic laboratory. Alternatively, a printed photograph could be scanned into a digital image file such as a ".jpg" or ".bmp", or ".tiff" format file or any other suitable graphic image file format.

The method may optionally include sizing 133 the picture of the caregiver's face according to a template. Where the graphic image of the caregiver is larger or smaller than the space for placing it on a doll 100, the printed size of the image of the caregiver's face may be adjusted so that it will have the correct size to fit, for example, on the face portion 105 of the doll 100. A template (digital or physical) may be supplied for this purpose according to the present invention.

The method may further include printing 135 the picture of the caregiver's face. The appropriately sized picture may printed, for example, in color and on a durable medium such as Jacquard™ inkjet fabric or any other ink jet receptive media suitable for the purposes described herein.

The method may further include cutting out 137 the image of the face of the caregiver in the printed picture from its background. The part of the printed picture bearing the image of the face of the caregiver may be separated from its background, where the background is unnecessary.

The method may further include attaching 139 the image of the face of the caregiver in the printed picture to the face portion of the doll. The cut-away part of the printed picture bearing the image of the face of the caregiver may then be attached to the face portion 105 of the doll 100. The cut-away part could be glued or sewn or otherwise attached directly to the face portion 105. The cut-away part may be glued to a curved plastic insert that can be connected to the head 104 over the face portion 105. The curved plastic insert may be held in place by clips concealed in the hair, cap, and collar of the doll 100. According to another embodiment, tape may be used to affix the cut-away part to the face 105 of the doll 100. According to still another embodiment, the image of the face of the caregiver could be printed, drawn or painted directly on to the face 105 of the doll 100 to eliminate cutting 137 and attaching 139. Direct printing may be achieved using an ink jet printer, for example.

It will be understood that while the second embodiment has been illustrated as a doll, the invention can provide toys of other forms such as mobiles, jacks in the box, and the like, for bearing the likeness of the caregiver's face and containing the apparatus for recording and reproducing the voice of the caregiver speaking personal messages to the child.

While the invention has been described in conjunction with the illustrated embodiments, it will be understood that these embodiments are not intended to limit the scope of the invention. Various modifications, alternative constructions and equivalents may be employed without departing from the scope of the appended claims. For example, embodiments of the present invention may be used in the context of television shows and commercials. Moreover, one or more features of any embodiment may be combined with any other feature of any other embodiment in any manner without departing from the scope of the present invention.

What is claimed is:

1. A method of communicating with a child, comprising:
   providing a stock doll, the stock doll comprising:
      a head including a blank face portion;
      a torso attached to the head;
      a curved plastic insert configured to cover the blank face portion; and
      clips within the head to secure the curved plastic insert over the blank face portion;
   customizing the stock doll to generate a customized doll, the customizing the stock doll comprising:
      obtaining an image of at least a face of a known person;
      sizing the image according to a template;
      cutting the image to fit the curved plastic insert;
      placing the image underneath the curved plastic insert;
      placing the curved plastic insert over the blank face portion, wherein the image is visible between the curved plastic insert and the blank face portion to generate the customized doll; and
   delivering the customized doll to the child,
   wherein the step of placing the curved plastic insert over the blank face portion with the image underneath the curved plastic insert comprises holding the curved plastic insert in place using the clips concealed within the head of the doll.

* * * * *